*(12)* United States Patent
Livingston et al.

(10) Patent No.: US 9,127,123 B2
(45) Date of Patent: Sep. 8, 2015

(54) MEMBRANE ENHANCED POLYMER SYNTHESIS

(75) Inventors: Andrew Guy Livingston, Knebworth (GB); Piers Robert James Gaffney, London (GB); Renato Campos Vasconcelos, Espinho (PT)

(73) Assignee: Imperial Innovations Limited, London (GB)

( * ) Notice: Subject to any disclaimer, the term of this patent is extended or adjusted under 35 U.S.C. 154(b) by 271 days.

(21) Appl. No.: 13/699,848

(22) PCT Filed: May 25, 2011

(86) PCT No.: PCT/GB2011/050989
§ 371 (c)(1),
(2), (4) Date: Nov. 26, 2012

(87) PCT Pub. No.: WO2011/148177
PCT Pub. Date: Dec. 1, 2011

(65) Prior Publication Data
US 2013/0072691 A1 Mar. 21, 2013

(30) Foreign Application Priority Data
May 27, 2010 (GB) .................................. 1008902.7

(51) Int. Cl.
*C08G 65/34* (2006.01)
*C08G 65/46* (2006.01)
*C08G 65/333* (2006.01)
*C08G 65/325* (2006.01)
*C08G 65/331* (2006.01)
*C08G 65/332* (2006.01)

(52) U.S. Cl.
CPC ........ *C08G 65/33341* (2013.01); *C08G 65/325* (2013.01); *C08G 65/331* (2013.01); *C08G 65/333* (2013.01); *C08G 65/3326* (2013.01); *C08G 65/33306* (2013.01); *C08L 2203/02* (2013.01)

(58) Field of Classification Search
USPC .......... 525/408–411, 242, 275, 293; 528/425, 528/491
See application file for complete search history.

(56) References Cited

U.S. PATENT DOCUMENTS

| 5,691,387 | A | 11/1997 | Emanuele et al. |
| 6,168,719 | B1 | 1/2001 | Shimokawa et al. |
| 2005/0176896 | A1* | 8/2005 | Bentley et al. ................. 525/409 |

FOREIGN PATENT DOCUMENTS

| CN | 102939320 | 2/2013 |
| EP | 0949275 | 10/1999 |
| WO | WO 99/20683 | 4/1999 |
| WO | WO 02/14380 | 2/2002 |
| WO | WO 2007/126834 | 11/2007 |
| WO | WO 2007/127473 | 11/2007 |
| WO | WO 2011/148177 | 12/2011 |

OTHER PUBLICATIONS

Senel et al., A novel intrisically proton conducting star-shaped imidazole terminated oligomers, Inoics (2009) 15:421-426.*
Ahmed et al., "Synthesis of oligo(ethylene glycol) toward 44-mer," *J. Org. Chem.*, 2006; 71: 9884-9886.
French et al., "'High purity discret PEG-oligomer crystals allow structural insight," Agnew Chem. Int. Ed., 2009; 48:1248-1252.
Loiseau et al., "Multigram synthesis of well-defined extended bifunctional polyethylene glycol (PEG) chains," J. Org. Chem., 2004; 69:639-647.
Thompson et al., "Synthesis and applications of heterobifunctional poly (ethylene oxide) oligomers," Polymer, 2007; 49(2): 345-373.
International Search Report and Written Opinion of the International Searching Authority for PCT/GB2011/050989, completed Nov. 23, 2011.

* cited by examiner

*Primary Examiner* — Monique Peets
(74) *Attorney, Agent, or Firm* — Barnes & Thornburg LLP

(57) ABSTRACT

This invention relates to the synthesis of polymers. More specifically, the present invention relates to the synthesis of heterobifunctional polymers and polymers with narrow and mono-disperse molecular weight distributions, and especially to the application of membranes to the synthesis of these polymers.

19 Claims, 11 Drawing Sheets

MEMBRANE ENHANCED POLYMER SYNTHESIS

CROSS-REFERENCE TO RELATED APPLICATIONS

This application is a national stage entry under 35 U.S.C. §371(b) of International Application No. PCT/GB2011/050989, filed May 25, 2011, which claims the benefit of United Kingdom Patent Application Serial No. 1008902.7, filed May 27, 2010, the disclosures of both which are hereby incorporated herein by reference.

FIELD OF THE INVENTION

This invention relates to the synthesis of polymers. More specifically, the present invention relates to the synthesis of heterobifunctional polymers and polymers with narrow and mono-disperse molecular weight distributions, and especially to the application of membranes to the synthesis of these polymers.

BACKGROUND TO THE INVENTION

Polymers such as polyethylene glycol (PEG, Scheme 1), also named polyethylene oxide (PEO), are of great interest due to their wide range of applications in the fields of biology and medicine (Haag and Fratz (2006) *Angewandte Chemie Int. Ed.* 45, 1198-1215), and organic synthesis (Gravert and Janda (1997) *Chemistry Reviews,* 97, 489-509).

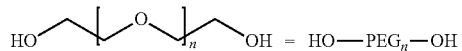

Scheme 1—structure of a polyethylene glycol (PEG) molecule. n=1, 2, 3 . . . to n PEG (from here on, whenever PEG is referred to, it is meant such polymer of any molecular weight) has several properties that make it attractive in biotechnology and medical applications. It is water soluble, non-toxic, largely non-immunogenic, and, when covalently attached to other molecules, the resulting conjugate presents different physico-chemical properties, often resulting in improved pharmacological properties of drugs. Polymers such as PEG, and others such as polypropylene glycol, polybutylene oxide and block copolymers of these, can be used to produce polymer-protein and drug-polymer conjugates, as well as supramolecular drug-delivery systems (Pasut and Veronese (2009) *Advanced Drug Delivery Reviews,* 61. 1177-1188; Haag and Fratz (2006), *Angewandte Chemie Int. Ed.* 45, 1198-1215). U.S. Pat. No. 4,179,337, describes the improvement of blood circulation lifetime of proteins attached to PEG (a technology named PEGylation), while Haag and Fratz (2006), *Angewandte Chemie Int. Ed.* 45, 1198-1215, review several polymer-protein drugs that have been approved, or are currently undergoing clinical trials. PEGylation of the insoluble drug taxol yielded a water soluble conjugate that still maintained its toxicity profile (Greenwald et al. (1995), *Journal of Organic Chemistry,* 60, 331-336). Encapsulation of the anticancer drug doxorubicin (DOX) in a PEGylated liposome has been shown to improve DOX delivery to cancer cells and to allow for a more favourable toxicity profile (Strother and Matei (2009), *Therapeutics and Clinical Risk Management.* 5, 639-650).

PEGs are also used as soluble polymer supports in the synthesis of several relevant molecules, such as peptides, oligonucleotides, oligosaccharides, and small molecules. Gravert and Janda (1997), *Chemistry Reviews.* 97, 489-509, review the polymers, chemistries, and separation and purification methods used in liquid phase organic synthesis.

As all the above mentioned applications develop, it becomes apparent that there is a need for PEGs, and other polymers, with one or both of two important properties: (i) mono-disperse molecular weight (MW) distribution, which allows full characterisation of single molecular entities instead of mixtures, and confers well defined physical properties (Hunter and Moghimi (2002), *Drug Discovery Today* 7(19), 998-1001; French et al., (2009), *Angewandte Chemie Int. Ed.* 48, 1248-1252; Greco and Vicent (2009), *Advanced Drug Delivery Reviews* 61, 1203-1213), and; (ii) different functional groups at their termini (Scheme 2), allowing for efficient attachment to different molecules (proteins, peptides, oligonucleotides, small molecule drugs, liposomes, and others), as well as cross-linking between different chemical species.

Scheme 2—structure of a heterobifunctional polyethylene glycol (PEG) molecule. n=1, 2, 3 . . . to n Common functional groups used to replace one of the hydroxyls of PEG (X, Y, scheme 2) include aldehyde, carboxylate, trifluorosulfonate, thiol, chloride, carboxy succinimidyl esters, p-nitrophenylcarbonate, benzotriazole carbonate and others known to those skilled in the art.

Heterobifunctional PEGs are often difficult to synthesise. Oxy-anion initiated ring-opening polymerisation of ethylene oxide most commonly yields heterobifunctional PEGs with a relatively inert methoxy in one terminus and wide MW distribution. This method has been extensively used, and several disadvantages are known to those skilled in the art and have been described elsewhere (Bentley et al. (2002), U.S. Pat. No. 6,448,369B1). Reacting PEG with equimolar amounts of reagent leads to a mixture of di-, mono- and unreacted PEG, which requires tedious purification. Purification becomes increasingly more challenging as the MW of the PEG increases, due to the diminishing difference in chemical and physical properties between the di-, mono- and unreacted species. Huang (1992) *Journal of Applied Polymer Science* 46, 1663-1671; and Huang and Hu (1993) *Journal of Applied Polymer Science* 47, 1503-1511 describe the synthesis of several heterofunctionalised PEGs via a technique that uses PEG as starting material and in which, by grafting the reacted material to PVA, precipitation procedures can be used for separation and purification. Chromatographic methods with different synthetic strategies have also been applied in the synthesis of heterobifunctional PEGs (Zalipsky (1993) *Bioconjugate Chemistry* 4, 296-299; Phillips and Snow (1994) U.S. Pat. No. 5,298,410). U.S. Pat. No. 6,448,369B1 describes a method that avoids intermediate or final chromatographic methods by using benzyloxy-PEG-OH or arylmethyl oxy groups that can be removed under mild conditions by catalytic hydrogenolysis or acid/catalysed hydrolysis, and performing intermediate separations by ether precipitation. However, the restrictions entailed in the starting material limits the synthetic manipulations that can be undertaken and introduces PEG impurities that arise from the starting material.

The preparation of mono-disperse PEGs has been performed by the sequential conjoining of discreet short PEG oligomers, having single molecular compositions, in convergent routes to ever longer chains (Ahmed and Tanaka, (2004)

J. Org. Chem., vol. 71, pages 9884-9886; French et al., (2009) Angewandte Chemie Int. Ed. 48, 1248-1252). This process shares some problems with the preparation of heterobifunctional PEGs, particularly that it becomes increasingly difficult to separate products from reactants as the molecular weight increases. Furthermore, the need to minimise purification difficulties by using near-stoichiometric combinations of PEG oligomers in the key etherification reaction has meant that reactions could not be forced to completion. Additionally, side-reactions of the starting materials, such as basic depolymerisation of ethylene oxide units from the PEG alkoxide nucleophile, and elimination of the PEG sulfonate electrophile to the corresponding vinyl ether (Loiseau et al., (2004), J. Org. Chem., vol. 69, pages 639-647), further diminished yield and product purity.

Membrane processes are well known in the art of separation science, and can be applied to a range of separations of species of varying molecular weights in liquid and gas phases (see for example "Membrane Technology" in Kirk Othmer Encyclopedia of Chemical Technology, 4th Edition 1993, Vol 16, pages 135-193). Nanofiltration is a membrane process utilising membranes whose pores are in the range 0.5-5 nm, and which have MW cutoffs of 200-3,000 Daltons. Nanofiltration has been widely applied to filtration of aqueous fluids, but due to a lack of suitable solvent stable membranes has not been widely applied to separation of solutes in organic solvents. Ultrafiltration membranes typically have MW cutoffs in the range 3,000 to 1,000,000 Daltons. Recently new classes of membranes have been developed which are stable in even the most difficult solvents as reported in P. Vandezande, L. E. M. Gevers and I. F. J. Vankelecom Chem. Soc. Rev., (2008), Vol 37, pages 365-405. These may be polymeric membranes or ceramic membranes, or mixed inorganic/organic membranes.

It is an object of the present invention to provide an improved process for the preparation of heterobifunctional polymers.

It is a further object of the present invention to provide an improved process for the preparation of mono-disperse polymers or polymers with narrow molecular weight distributions.

BRIEF SUMMARY OF THE INVENTION

The present invention relates to a method for the preparation of heterobifunctional polymers, and polymers with narrow and mono-disperse molecular weight (MW) distributions. According to this invention, a polymer/branch point molecule conjugate is synthesised and the free "unbound" terminals of the polymer molecules of the conjugate are either functionalised or reacted with additional monomers or polymer units by one or more reactions carried out in a reaction solvent. Separation of the conjugate from reaction by-products and excess reagents in between the reactions is carried out for at least one of the reactions by diafiltration of the post-reaction mixture using an organic solvent, employing a membrane that is stable in the organic solvent and which provides a rejection for the conjugate which is greater than the rejection for at least one of the reaction by-products or excess reagents.

Therefore, in a first aspect, the present invention provides a process for the preparation of heterobifunctional and/or polymers with narrow and mono-disperse molecular weight distributions comprising the following steps:

(a) reacting an excess of an initial polymer dissolved in a solvent with a branch point molecule to form a polymer mixture containing at least the initial polymer and a conjugate comprising at least two polymer molecules covalently bound to the branch point molecule such that each polymer molecule has a terminal which is bound to the branch point molecule and at least one unbound terminal;

(b) contacting the polymer mixture with a semi-permeable membrane which has a rejection for the conjugate which is greater than the rejection for the initial polymer, so that the ratio between the concentrations of the conjugate and the initial polymer in the retentate is increased; and (c) cleaving the polymer of the conjugate from the branch point molecule;

wherein the at least one unbound terminal of the polymer molecule of the conjugate is chemically modified to either modify the functionality of the unbound terminal or add additional monomer or polymer units to the polymer and wherein said modification occurs either prior to or subsequent to step (b) such that the polymer cleaved from branch point molecule in step (c) comprises the initial polymer comprising at least one chemically modified terminal.

In a particular aspect, the present invention provides a process for the preparation of heterobifunctional polymers comprising the following steps:

(a) reacting an excess of an initial polymer dissolved in a solvent with a branch point molecule to form a polymer mixture containing at least the initial polymer and a conjugate comprising at least two polymer molecules covalently bound to the branch point molecule such that each polymer molecule has a terminal which is bound to the branch point molecule and at least one unbound terminal;

(b) contacting the polymer mixture with a semi-permeable membrane which has a rejection for the conjugate which is greater than the rejection for the initial polymer, so that the ratio between the concentrations of the conjugate and the initial polymer in the retentate is increased; and (c) cleaving the polymer from the branch point molecule of the conjugate;

wherein the at least one unbound terminal of the polymer molecule of the conjugate is reacted to chemically modify the functionality of the unbound terminal of the polymer and wherein said modification occurs either prior to or subsequent to step (b) such that the polymer cleaved from branch point molecule in step (c) comprises the initial polymer comprising at least one terminal with different functionality.

In a further particular aspect, the present invention provides a process for the preparation of polymers with narrow and mono-disperse molecular weight distributions comprising the following steps:

(a) reacting an excess of an initial polymer dissolved in a solvent with a branch point molecule to form a polymer mixture containing at least the initial polymer and a conjugate comprising at least two polymer molecules covalently bound to the branch point molecule such that each polymer molecule has a terminal which is bound to the branch point molecule and at least one unbound terminal;

(b) contacting the polymer mixture with a semi-permeable membrane which has a rejection for the conjugate which is greater than the rejection for the initial polymer, so that the ratio between the concentrations of the conjugate and the initial polymer in the retentate is increased; and (c) cleaving the polymer from the branch point molecule of the conjugate;

wherein the at least one unbound terminal of the polymer molecule of the conjugate is chemically modified by the addition of further monomer or polymer units to the unbound terminal of the polymer and said modification occurs either prior to or subsequent to step (b) such that the polymer cleaved from branch point molecule in step (c) comprises a modified polymer which is monodisperse or has a narrow molecular weight distribution.

DESCRIPTION OF VARIOUS EMBODIMENTS

The term "heterobifunctional" is used herein to refer to linear or branched polymers having one functional group at one terminal and a different functional group at least one other terminal.

The term "mono-disperse" is used herein to refer to linear or branched polymers having the same molecular weight.

The term "initial polymer" is used herein to refer to a polymeric starting material that may be linear or branched.

The term "branch point molecule" is used herein to refer to a polyfunctional organic molecule, having at least 2 reactive moieties, and the ability to covalently bind to a terminal of the initial polymer.

In one embodiment of the invention, the initial polymer of the present invention may be chosen from polyethylene glycol (PEG), polypropylene glycol, polybutylene oxide, and their block copolymers.

In a further embodiment, the initial polymer may be chosen from among polypropylene oxide (PPO), block copolymers of PPO and PEG, polydimethylsiloxane (PMDS), polybutadiene and polyisoprene, nylons and polyesters formed with either the di-acid in excess to generate polymers terminating in carboxylic acids, or the di-amine/diol in excess to generate polymers terminating with amino/hydroxyl groups, and poly [ethylene sulfide].

The initial polymer may also be any polymer with the formula X-polymer-X, where X can be a carboxylate, an amine, a thiol or any other well known reactive entity.

In a particular embodiment, the initial polymer is PEG.

Figure 1:
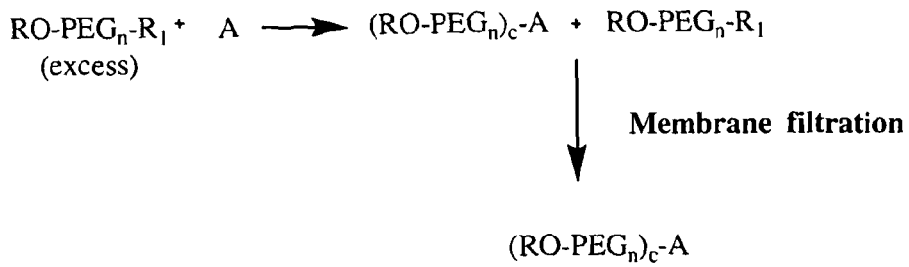
FIG. 1—shows schematically the reaction and separation steps of the present invention.

In a further embodiment of the present invention, the initial polymer is reacted in excess with a branch point molecule allowing for the synthesis of a conjugate comprising at least two polymer molecules covalently bound to the branch point molecule that can be purified from the excess linear initial polymer by membrane filtration, as shown in FIG. 1. In FIG. 1, R represents —H, methoxy, benzyl, or any other hydroxyl protecting group, and R$_1$ represents hydroxyl or any other reactive functional group, A represents the branch point molecule and is a polyfunctional organic molecule, having at least 2 reactive moieties, and the ability to covalently bind to the initial polymer, and c, having the value of 2 to n, represents the number of branches, being that 2 represents a 2-arm branched molecule, 3 a 3-arm branched molecule, etc. The chemistries used to covalently bind the initial polymer molecule to the branch point molecule are those well known to those skilled in the art and include amide, ester, ether, silyl ether, and others.

The branch point molecules for the invention can be selected from a very large group of polyfunctional organic molecules known in the art, including by way of example, but not restricted to, the following structures:

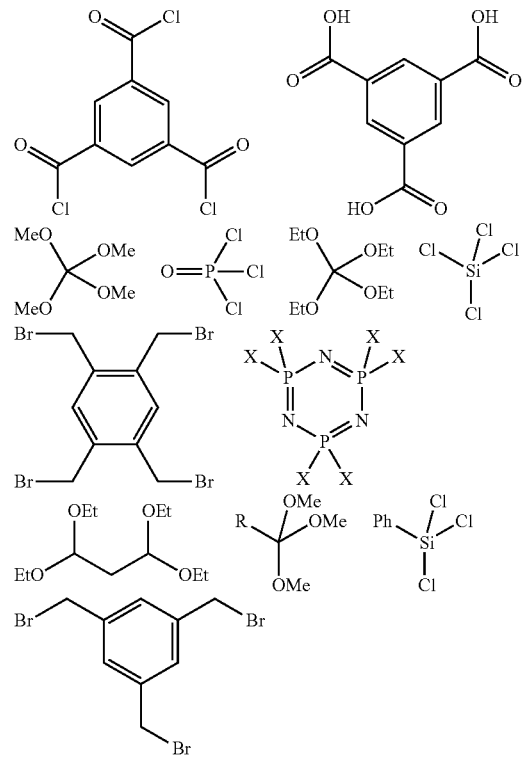

In an embodiment, the process is a process for the preparation of heterobifunctional polymers. In such an embodiment, any protecting groups present at the unbound terminal of the polymer of the conjugate are removed. Once any protecting groups have been removed, or if no protecting groups are present, the unbound terminal of the polymer is reacted to alter its functionality to provide a modified polymer, which, when cleaved from the branch point molecule, is a heterobifunctional polymer having a different functionality at the unbound terminal to that which is present at the terminal that was bound to the branch point molecule. The polymer may be further modified once it has been cleaved from the branch point molecule to give the final heterobifunctional polymer product.

In a further embodiment, the process is a process for the preparation of monodisperse polymers or polymers with a narrow molecular weight distribution. In such embodiments, the unbound terminal of the polymer of the conjugate may be reacted to remove any protecting groups that may be present. Once any protecting groups have been removed, or if no protecting groups are present, the unbound terminal is reacted with another polymer or monomer unit to extend the length of the polymer molecules of the conjugate. The use of excess polymer or monomer unit allows the reaction to be forced to completion, so that the product conjugate maintains the narrow molecular weight distribution or mono-dispersity of the starting material.

By using fixed length initial polymers and coupling the unbound terminal to a further fixed length polymer can result in the formation of monodisperse polymers upon cleavage from the branch point molecule.

In an embodiment, the chemical modification of the polymer occurs prior to step (b).

In an alternative embodiment, the chemical modification occurs subsequent to step (b).

The functionalised or deprotected conjugate may be purified using further membrane separation or other conventional and known purification methods, such as liquid-liquid extraction, chromatography and others. The synthetic strategy may be repeated until the desired product is obtained.

The cleavage of the polymer chains from the branch point molecule is undertaken to yield substantially the initial polymer with any modifications made to the free unbound terminal ends. The choice of the cleavage reaction used to detach the polymer from the branch point molecule is dependent on the product one desires to synthesise and can be performed at the end of the synthetic strategy or at any stage, according to convenience.

Figure 2:
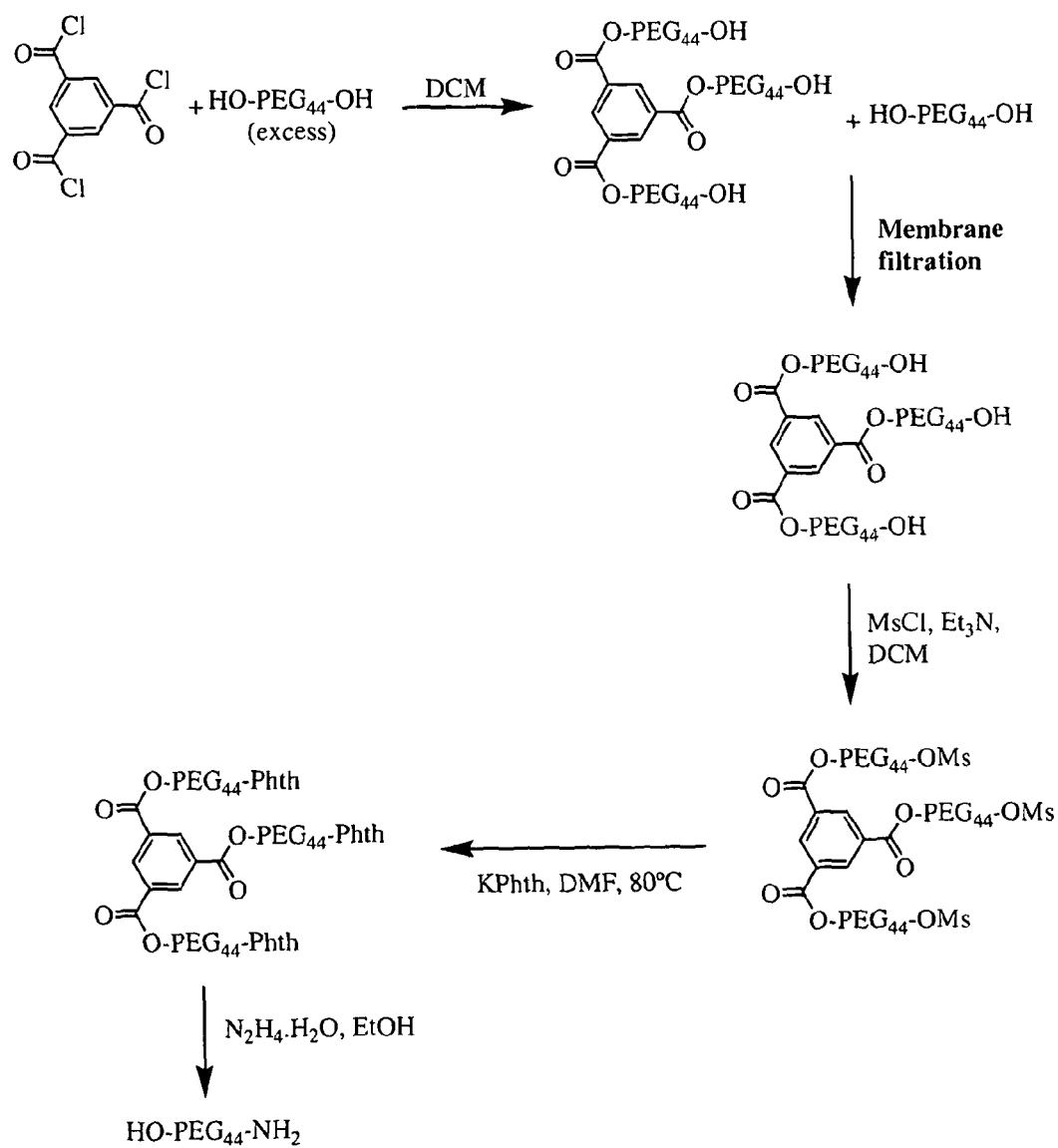
FIG. 2—shows a schematic for the synthesis of HO-PEG$_{44}$-NH$_2$

In a further embodiment, a synthetic strategy to prepare HO-PEG$_{44}$-NH$_2$ is depicted in FIG. 2. Excess PEG (average MW=~2,000 Daltons, n=44) is reacted with benzene-1,3,5-tricarbonyl trichloride. The resulting high MW branched benzene-1,3,5-(CO$_2$-PEG$_{44}$-OH)$_3$ is then purified from the excess PEG using a solvent stable nanofiltration membrane. Functionalisation of the free hydroxyl terminus and cleavage from the branch point molecule is achieved by chemistries previously reported and well known by those skilled in the art.

Figure 3:
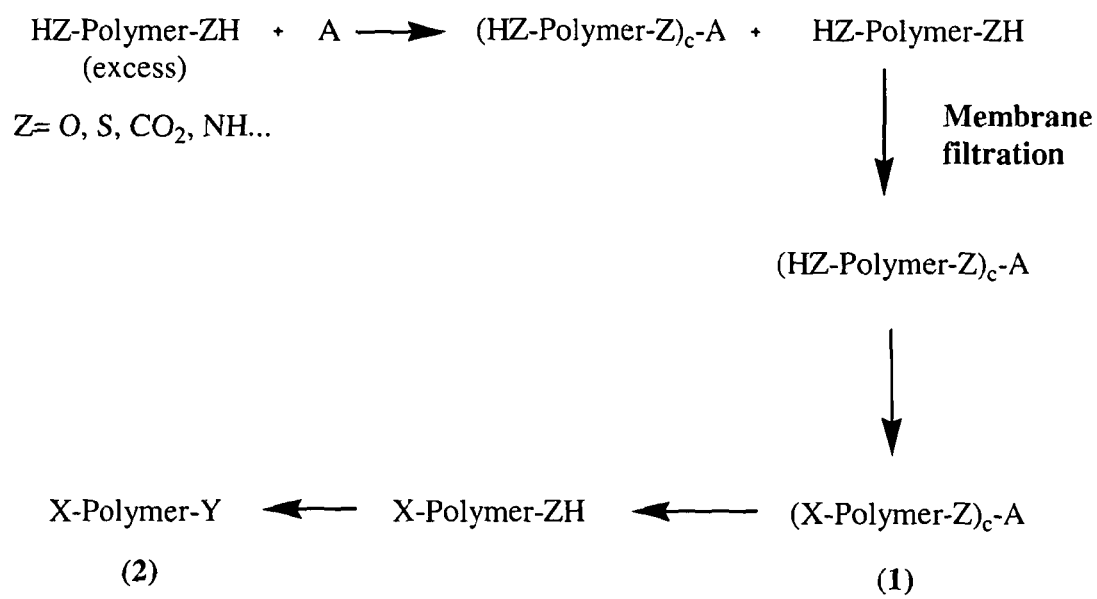
FIG. 3—shows a general schematic of the proposed invention

A further embodiment of the invention is shown in FIG. 3. Products of this embodiment include branched polymers, linear polymers with mono-disperse or narrow MW distribution, and heterobifunctional polymers, all of which may be coupled with other moietes, such as proteins, drugs, other polymers, peptides, oligonucleotides, and others. In FIG. 3, A represents the branch point molecule, HZ-Polymer-ZH represents the initial polymer, and (1) and (2) represent, respectively, a conjugate and a linear product polymer with functionalised termini, being that (1) is a n-arm polymer when c=n but should not be limited to it. X and Y represent functional groups that could be but are not limited to, at the same time or independently, hydroxyl, methoxy, amine, azide, carboxylic acids and others.

Other suitable functional X and/or Y groups include:
amineoxy (e.g. PEG-ONH$_2$) or aldehyde (e.g. PEG-OCH$_2$CHO), both of which can react together under mildly acid pH and at low concentration to give an oxime ether (e.g. PEG-ONH=CH—CH$_2$—OPEG);
acetylene (e.g. propargyl ether, PEG-OCH2-CCH) which combines with azides to give a triazole in the presence of a Cu(I) catalyst;
a phosphine reagent that undergoes a Staudinger ligation with an azide;
adamantyl ether (small round hydrocarbon cage) or beta-cyclodextrin (cyclic glucose heptamer with a greasy central cavity) which form a very tight inclusion complex that has been used to cross-link PEGs;
biotin (vitamin H), a readily available small molecule with a single carboxylic acid that can be condensed with a PEG terminal OH or NH$_2$, that forms an incredibly tight complex with streptavidin/avidin and is very commonly used for biocompatible cross-linking
polymer monomers, for instance condensing with acrylate, or etherifying with para-chloromethyl styrene.

Such functional groups can be used for attachment to a biomolecule (peptide, oligonucleotide, saccharide, phospholipid) for receptor recognition or biophysical association, or for coupling to drugs.

In a further embodiment, X and Y may be chosen from the following functional groups:

| X | Y | X | Y |
| --- | --- | --- | --- |
| MeO | OH | BocNH | NH$_2$ |
| MeO | NH$_2$ | BocNH | OH |
| HO | NH$_2$ | N$_3$ | NH$_2$ |
| HO | N$_3$ | FmocNH | COOH |
| COOH | N$_3$ | HS | COOH |
| MeO | SH | NHS ester | BocNH |
| MeO | COOH | NH$_2$ | COOH |
| HO | SH | MAL | NH$_2$ |

Figure 4:
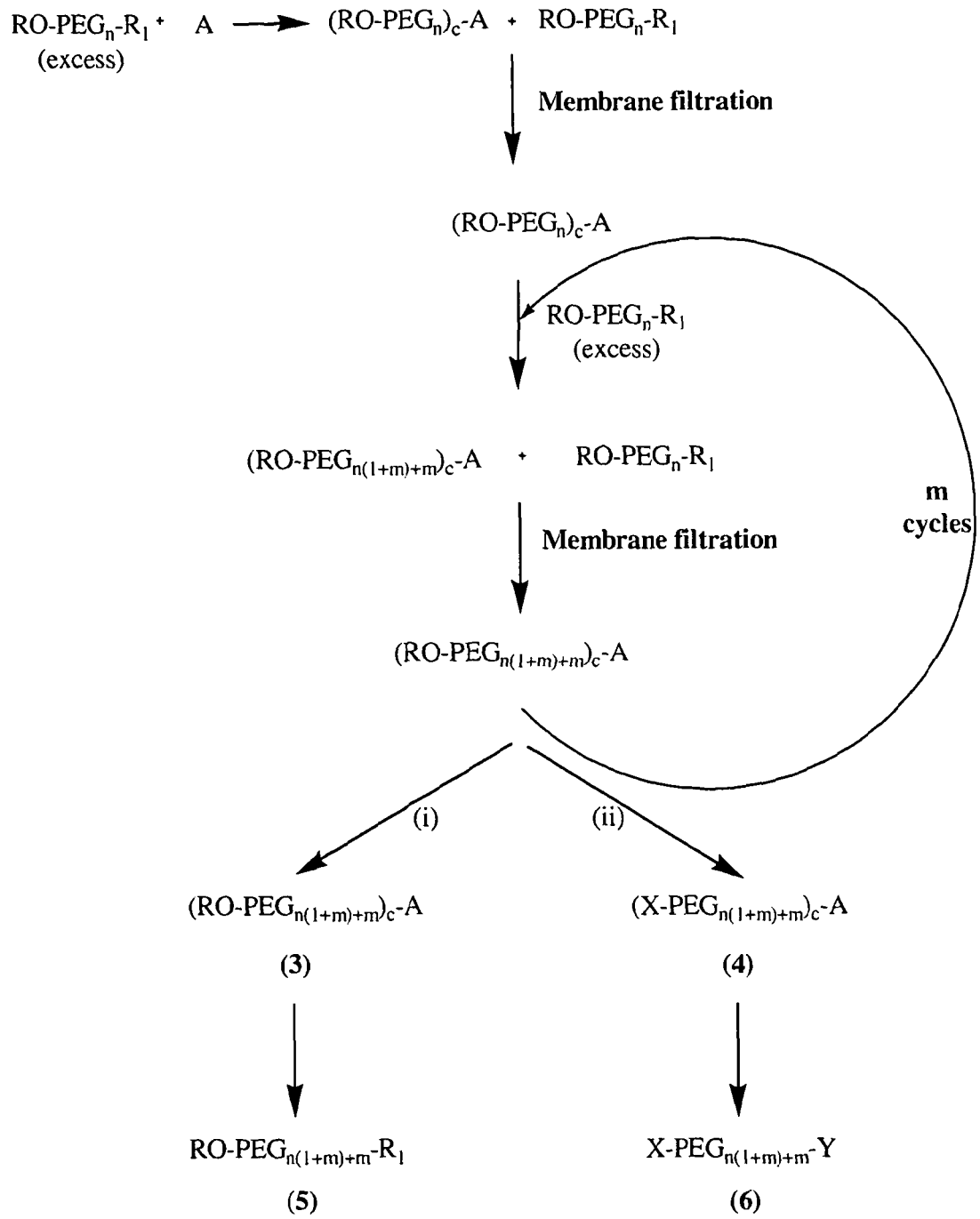
FIG. 4—shows a general schematic for a further embodiment of the proposed invention, providing for synthesis of mono-disperse PEG.

In yet a further embodiment of this invention, an initial polymer is reacted in excess with the branch point molecule, allowing for the synthesis of a conjugate that can be purified from the excess initial polymer by membrane filtration. Subsequently, the polymer chains can be extended through a succession of coupling/deprotection reactions using the same or a different polymer from the initial polymer. The separation of the growing polymer from reaction by-products and excess reagents in between the reactions may be carried out for at least one of the reactions by diafiltration. The cycle of deprotection/coupling reactions can be performed so as to obtain the desired polymer MW. The chemistries used for chain extension are those reported and known for those skilled in the art (French et al., (2009), *Angewandte Chemie Int. Ed.* 48, 1248-1252). According to convenience (for example, to obtain polymer increased biodegradability, or to introduce spacers for pH controlled condensation), other linkages can be used for chain extension, such as carboxyl or phosphate esters, amine and acetals linkages. Following chain extension, the polymer can be cleaved from the branch point molecule or functionalised in order to synthesise a heterobifunctional polymer. It is evident that block co-polymers can be formed when at least one of the polymers used for chain extension is different from the initial polymer. FIG. 4 illustrates this embodiment for the synthesis of mono-disperse PEG, where, RO-PEG$_n$-R$_1$ represents the starting PEG (e.g. a monodisperse PEG such as hexagol (hexaethylene glycol)), A represents the branch point molecule, (3) is a PEG conjugate (5) is the chain extended mono-disperse PEG, (4) is a functionalised PEG conjugate, and (6) is a chain extended functionalised PEG.

In a further embodiment, the solvent used for the diafiltration may be different from the solvent used for the reaction immediately preceding the diafiltration, or from the solvent required for the reaction subsequent to the diafiltration. The solvent used for the diafiltration should maintain the polymer and/or the functionalised polymer in solution.

Suitable membranes for use in the invention include polymeric and ceramic membranes, and mixed polymeric/inorganic membranes. Membrane rejection $R_i$ is a common term known by those skilled in the art and is defined as:

$$R_i = \left(1 - \frac{C_{P,i}}{C_{R,i}}\right) \times 100\% \qquad \text{eq. (1)}$$

where $C_{P,i}$=concentration of species i in the permeate, permeate being the liquid which has passed through the membrane, and $C_{R,i}$=concentration of species i in the retentate, retentate being the liquid which has not passed through the membrane. It will be appreciated that a membrane is suitable for the invention if $R_{(conjugate)} > R_{(at\ least\ one\ reaction\ by\text{-}product\ or\ reagent)}$.

The membrane of the present invention may be formed from any polymeric or ceramic material which provides a separating layer capable of preferentially separating the polymer product from at least one reaction by-product or reagent. Preferably the membrane is formed from or comprises a material selected from polymeric materials suitable for fabricating microfiltration, ultrafiltration, nanofiltration or reverse osmosis membranes, including polyethylene, polypropylene, polytetrafluoroethylene (PTFE), polyvinylidene difluoride (PVDF), polysulfone, polyethersulfone, polyacrylonitrile, polyamide, polyimide, polyetherimide, cellulose acetate, polyaniline, polypyrrole, polybenzimidazole and mixtures thereof. The membranes can be made by any technique known in the art, including sintering, stretching, track etching, template leaching, interfacial polymerisation or phase inversion. More preferably, membranes may be crosslinked or treated so as to improve their stability in the reaction solvents. PCT/GB2007/050218 describes membranes which may be suitable for use in the present invention.

In a preferred aspect the membrane is a composite material and the non-porous, selectively permeable layer thereof is formed from or comprises a material selected from modified polysiloxane based elastomers including polydimethylsiloxane (PDMS) based elastomers, ethylene-propylene diene (EPDM) based elastomers, polynorbornene based elastomers, polyoctenamer based elastomers, polyurethane based elastomers, butadiene and nitrile butadiene rubber based elastomers, natural rubber, butyl rubber based elastomers, polychloroprene (Neoprene) based elastomers, epichlorohydrin elastomers, polyacrylate elastomers, polyethylene, polypropylene, polytetrafluoroethylene (PTFE), polyvinylidene difluoride (PVDF) based elastomers, polyetherblock amides (PEBAX), polyurethane elastomers, crosslinked polyether, polyamides formed by interfacial polymerisation, and mixtures thereof.

Yet more preferably the membrane is prepared from an inorganic material such as by way of non-limiting example silicon carbide, silicon oxide, zirconium oxide, titanium oxide, or zeolites, using any technique known to those skilled in the art such as sintering, leaching or sol-gel processes.

EXAMPLES

All heterobifunctional products were characterised using terminal acylation by TFA anhydride. ~10 mg were dissolved in 0.5% TFA anhydride in CDCl$_3$, and analysed by NMR (Jo et al. (2001). *Biomacromolecules*. 2, 255-261). The ratio of the downfield peak integrals of the TFA acylated terminus to signals from the other chain terminus allows for the estimation of the conversion and purity (of monofunctionalised PEG to unconverted (HO-PEG$_{44}$-OH)). Table 1 summarises the results for all examples.

Example 1

Synthesis of HO-PEG$_{44}$-Phth

Step 1—Synthesis of Ph-Si—(O-PEG$_{44}$-OH)$_3$

Figure 5:
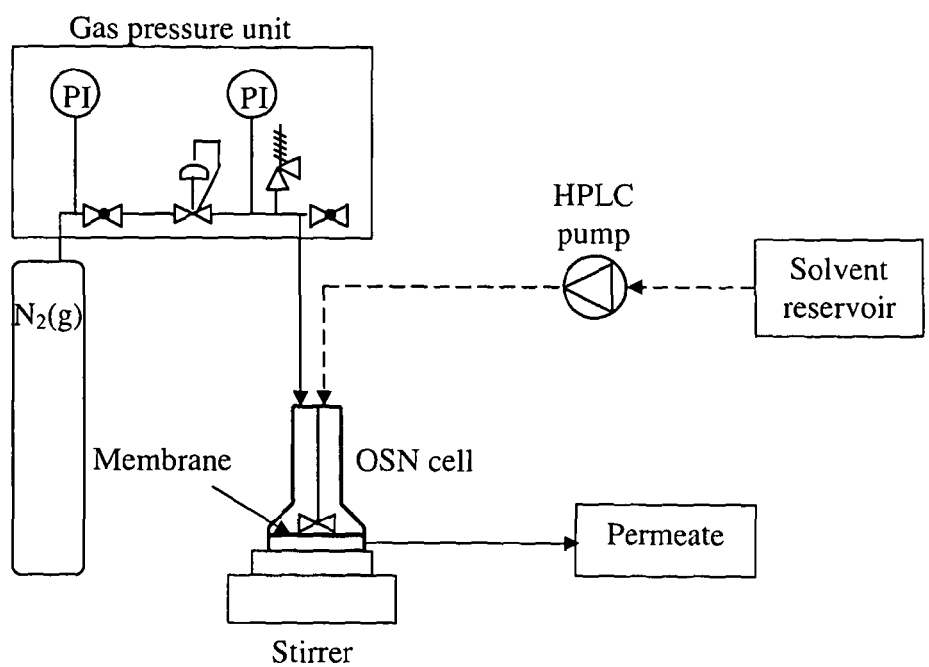
FIG. 5—shows a schematic of the OSN apparatus

HO-PEG$_{44}$-OH (~2,000 g mol$^{-1}$, 14.4 g, 7.2 mmol) was co-evaporated with dry toluene (TOL) (4×20 ml) and dissolved in dry dichloromethane (DCM) (25 ml). Imidazole (0.230 g, 2.8 mmol) was added to the solution, and stirred under a nitrogen atmosphere at room temperature. Trichlorophenylsilane (0.115 ml, 0.71 mmol) was slowly added. The reaction was stirred overnight and quenched with an excess of DI water (3 ml, 15 min). The reaction solution was then diluted with DCM (100 ml) and washed with DI water (100 ml). The aqueous layer was extracted with further DCM (100 ml). The combined organic fractions were washed with DI water (200 ml), dried over anhydrous Na$_2$SO$_4$, filtered, and evaporated to dryness to give the crude material (13.1 g). This was re-dissolved in DCM for OSN purification. OSN purification was carried out using a crosslinked polyimide membrane prepared as described in PCT/GB2007/050218. The membrane was used as a 51.4 cm$^2$ circular disc mounted in a pressurised cell, and filtration was carried out at 10 bar (see FIG. 5 for a schematic of the OSN apparatus). Fresh DCM solvent was added to provide diafiltration using an HPLC pump. The product was washed with 12-15 diafiltration volumes (p=7-8 atm, r.t.) to give Ph-Si—(O-PEG$_{44}$)$_3$ (1.35 g, 31%). $\delta_H$ (400 MHz, CDCl$_3$); 3.46-3.89 (546H, m, 273× OCH$_2$), 3.96 (6H, t, J 4.0, 3×PhSiOCH$_2$), 7.36 (2H, t, J 7.4, Ph), 7.43 (1H, t, J 7.4, Ph), 7.68 (2H, d, J 7.7, Ph) ppm.

Step 2—Synthesis of Ph-Si—(O-PEG$_{44}$-OMs)$_3$

Ph-Si—(O-PEG$_{44}$-OH)$_3$ (0.300 g, 0.05 mmol) was co-evaporated with dry TOL (3×10 ml) and dissolved in dry DCM (3 ml). To the stirred solution at room temperature, under a nitrogen atmosphere, were added first triethylamine (Et$_3$N) (0.045 ml, 0.30 mmol) then slowly methanesulfonyl chloride (MsCl) (0.060 ml, 0.75 mmol). The reaction was stirred overnight and quenched with DI water (0.500 ml) for 30 min. The reaction solution was then diluted with DCM (50 ml) and washed with DI water (1×50 ml), and sat. aq. NaHCO$_3$ (50 ml). The aqueous layer was extracted with further DCM (100 ml). The combined organic fractions were dried over anhydrous Na$_2$SO$_4$, filtered, and evaporated to dryness to give Ph-Si—(O-PEG$_{44}$-OMs)$_3$ (0.192 g, 62%). $\delta_H$ (400 MHz, CDCl$_3$); 3.02 (9H, s, SO$_2$CH$_3$), 3.38-3.76 (546H, m, 273×OCH$_2$), 3.89 (6H, t, J 3.9, 3×PhSiOCH$_2$), 4.31 (6H, t, J 4.3, 3×CH$_2$OMs), 7.36 (2H, t, J 7.4, Ph), 7.43 (1H, t, J 7.4, Ph), 7.61 (2H, d, J 7.6, Ph) ppm.

Step 3—Synthesis of HO-PEG$_{44}$-Phth

Ph-Si—(O-PEG$_{44}$-OMs)$_3$ (0.192 g, 0.03 mmol) was co-evaporated with dry TOL (2×5 ml) and dissolved in dry dimethylformamide (DMF) (20 ml). Potassium phthalimide (KPhth, 0.187 g, 10 mmol) was added to the stirred solution under a nitrogen atmosphere, and the temperature increased to 70° C. After 3 h the solution was allowed to cool down, diluted with DCM (100 ml) and washed with DI water (100 ml). The aqueous layer was extracted with further DCM (100 ml). The combined organic fractions were washed with aq. NaHCO$_3$/Na$_2$CO$_3$ (200 ml), dried over anhydrous Na$_2$SO$_4$, filtered, and concentrated under reduced pressure. This was then cooled in an ice-bath and diethyl ether (~15 vols) slowly added to the stirred solution to precipitate the crude material, which was evaporated from $CDCl_3$ (3×2 ml) [we have observed that Ph-Si—(OPEG$_{44}$-OH) is rapidly hydrolysed under acidic conditions to yield HO-PEG$_{44}$-Phth] (0.098 g, 52%). $\delta_H$ (400 MHz, $CDCl_3$); 3.44-3.82 [182H, m, $CH_2OH$ + (90×$OCH_2$)], 3.89 (6H, t, J 3.9, 3×$CH_2$Phth), 7.71 (2H, dd, 2.0, Phth), 7.83 (2H, dd, 2.0, Phth) ppm.

Figure 6A:
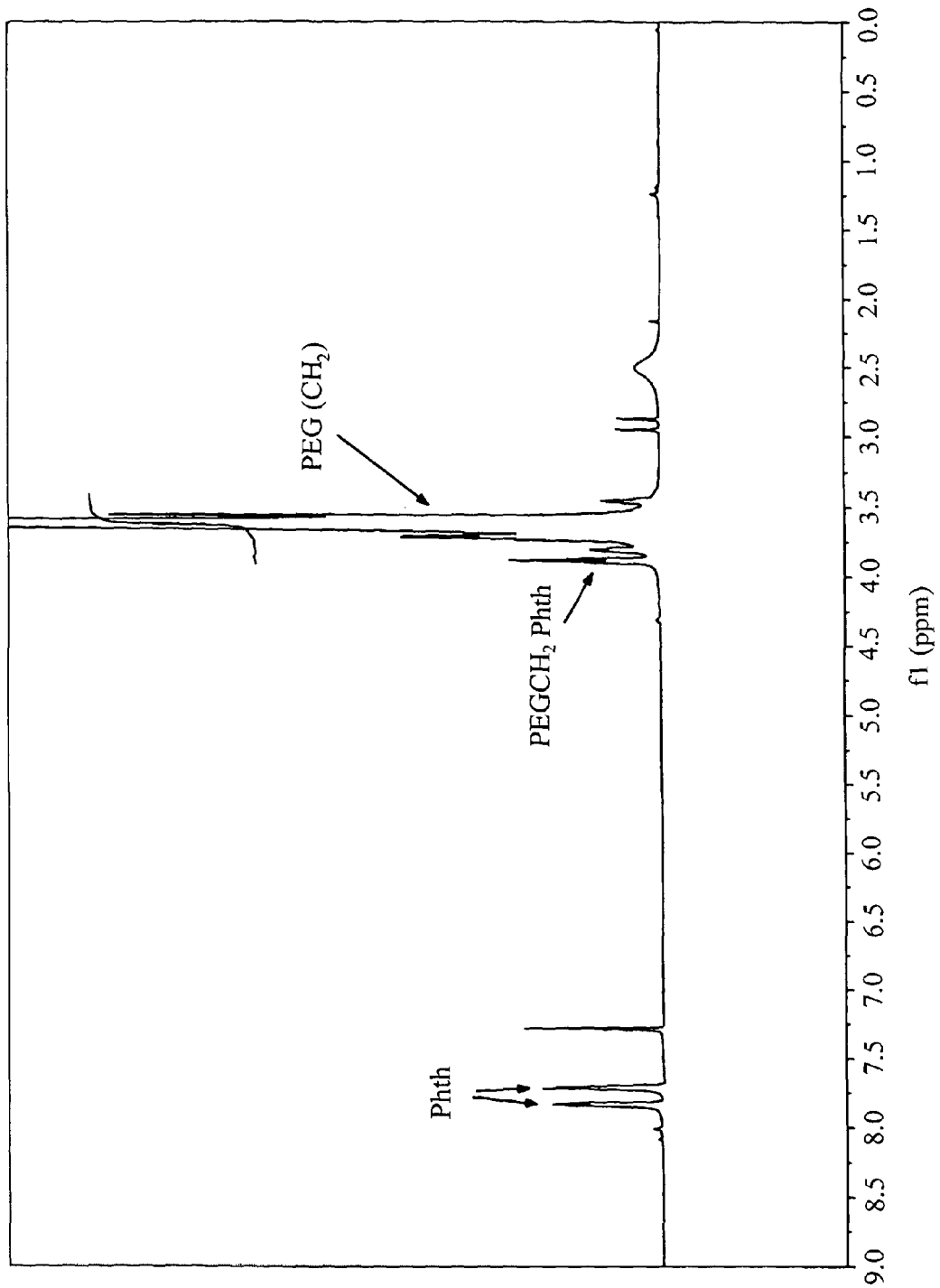
FIG. 6—shows the $^1$H-NMR spectrum of HO-PEG$_{44}$-Phth (Example 1): CDCl$_3$ (top), CDCl$_3$+5% v/v TFA anhydride (bottom)
Figure 6B:
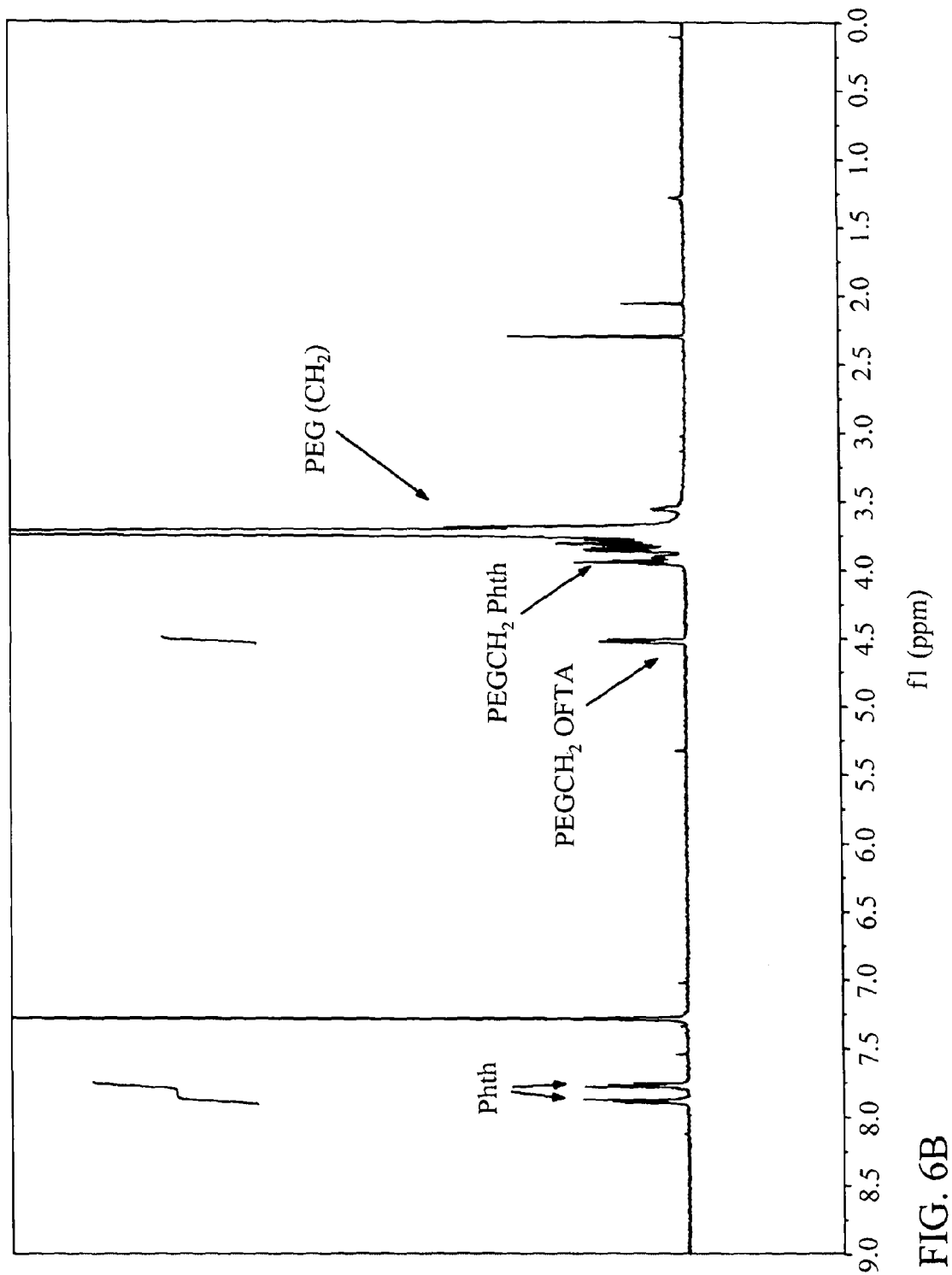

FIG. 6 shows the resulting $^1$H-NMR spectra of HO-PEG$_{44}$-Phth: $CDCl_3$ (top), and $CDCl_3$+5% v/v TFA anhydride (bottom)

Example 2

Synthesis of HO-PEG$_{44}$-NH$_2$

Step 1—Synthesis of benzene-1,3,5-($CO_2$-PEG$_{44}$-OH)$_3$

HO-PEG$_{44}$-OH (31.1 g, 15 mmol) was co-evaporated with dry TOL (3×60 ml) and dissolved in dry DCM (45 ml). To the stirred solution, under nitrogen atmosphere at room temperature, were added first N-methyl imidazole (NMI) (0.720 ml, 9 mmol), then slowly benzene-1,3,5-tricarbonyl trichloride (0.420 g, 1.6 mmol) dissolved in DCM (2 ml). The reaction was allowed to react overnight and was quenched with an excess of DI water for 30 min. The solution was then diluted with DCM (400 ml) and washed with half sat. aq. $NaHCO_3$ (250 ml). The aqueous layer was extracted with further DCM (200 ml). The combined organic fractions were washed with 0.1 M HCl (600 ml), dried over anhydrous $MgSO_4$, filtered, and evaporated to dryness. The crude material (28.8 g) was re-dissolved in DCM for OSN purification. OSN purification was carried out using a crosslinked polyimide membrane prepared as described in PCT/GB2007/050218. The membrane was used as a 54 cm$^2$ circular disc mounted in a pressurised cell, and filtration was carried out at 30 bar. Fresh DCM solvent was added to provide diafiltration using an HPLC pump. The product was washed with 12-15 diafiltration volumes (p=8 atm, r.t.) to yield benzene-1,3,5-($CO_2$-PEG$_{44}$-OH)$_3$ (4.63 g, 62%). $\delta_H$ (400 MHz, $CDCl_3$); 3.45-3.82 (540H, m, 270×$OCH_2$), 3.86 (6H, t, J 3.8, 3×$CO_2CH_2CH_2O$), 4.53 (6H, t, J 4.5, 3×$CO_2CH_2$), 8.86 (3H, s, Ar) ppm.

Step 2—Synthesis of benzene-1,3,5-($CO_2$-PEG$_{44}$-OMs)$_3$

Benzene-1,3,5-($CO_2$-PEG$_{44}$-OH)$_3$ (1.028 g, 0.16 mmol) was co-evaporated with dry TOL (3×15 ml) and dissolved in dry DCM (6 ml). To the stirred solution under a nitrogen atmosphere at room temperature were added first Et$_3$N (0.136 ml, 0.98 mmol), then slowly MsCl (0.190 ml, 2.44 mmol). After 7 h the reaction was quenched with DI water (0.500 ml) for 30 min and diluted with DCM (150 ml). This was washed with half sat. $NaHCO_3$ (1×150 ml), DI water (1×150 ml), and the aqueous layer was extracted with further DCM (300 ml). The combined organic fractions were dried over anhydrous $MgSO_4$, filtered, and evaporated to dryness to give crude benzene-1,3,5-($CO_2$-PEG$_{44}$-OMs)$_3$ (0.96 g, 93%). $\delta_H$ (400 MHz, $CDCl_3$); 3.11 (9H, s, $SO_2CH_3$), 3.47-3.85 (528H, m, 264×$OCH_2$), 3.78 (6H, t, J 3.8, 3×$OCH_2CH_2$OMs), 3.88 (6H, t, J 3.9, 3×$CO_2CH_2CH_2O$), 4.40 (6H, t, J 4.4, 3×$CH_2$OMs), 4.55 (6H, t, J 4.6, 3×$CO_2CH_2$PEG), 8.88 (3H, s, Ar) ppm.

Step 3—Synthesis of benzene-1,3,5-($CO_2$-PEG$_{44}$-Phth)$_3$

Benzene-1,3,5-($CO_2$-PEG$_{44}$-OMs)$_3$ (0.850 g, 0.13 mmol) was co-evaporated with dry acetonitrile (MeCN) (3×10 ml) and dissolved in dry DMF (60 ml). KPhth (0.740 g, 4 mmol) was added to the stirred solution under nitrogen atmosphere, and the temperature increased to 70° C. After 15 h the solution was allowed to cool down, diluted with DCM (150 ml) and washed with DI water (1×150 ml). The aqueous layer was extracted with further DCM (150 ml), the combined organic fractions dried over anhydrous $MgSO_4$, filtered, and concentrated under reduced pressure. The stirred crude solution was cooled in an ice-bath and ~15 vols of diethyl ether added to precipitate benzene-1,3,5-($CO_2$-PEG$_{44}$-Phth)$_3$ (0.593 g, 68%). $\delta_H$ (400 MHz, $CDCl_3$); 3.48-3.85 (528H, m, 264×$OCH_2$), 3.89 (6H, t, J 3.9, 3×$CO_2CH_2CH_2O$), 3.93 (6H, t, J 3.9, 3×$CH_2$Phth), 4.56 (6H, t, J 4.6, 3×$CO_2CH_2$), 7.73-7.75 (6H, m, J 7.7, 3×Phth), 7.86-7.88 (6H, m, 3×Phth), 8.89 (3H, s, Ar) ppm.

Step 4—Synthesis of HO-PEG$_{44}$-NH$_2$

Benzene-1,3,5-($CO_2$-PEG$_{44}$-Phth)$_3$ (0.593 g, 0.09 mmol) was co-evaporated with dry TOL (2×5 ml) and dissolved in ethanolic hydrazine hydrate (6 ml, 10% v/v). The solution was stirred at room temperature for 12 h, then quenched by the addition of acetone (5 ml) and stirred for 15 min. The solution was diluted with DCM (100 ml) and washed with aq. NaCl (150 ml, 5% w/v). The aqueous layer was extracted with further DCM (2×100 ml), the combined organic fractions dried over anhydrous $MgSO_4$, filtered, and evaporated under vacuum. The resulting crude product was co-evaporated under reduced pressure with DI water (3×2 ml) to give HO-PEG$_{44}$-NH$_2$ (0.315 g, 58%). $\delta_H$ (400 MHz, $CDCl_3$); 3.15 (2H, b, $CH_2NH_2$), 3.41-3.87 (184H, m, 92×$OCH_2$).

Figure 7A:
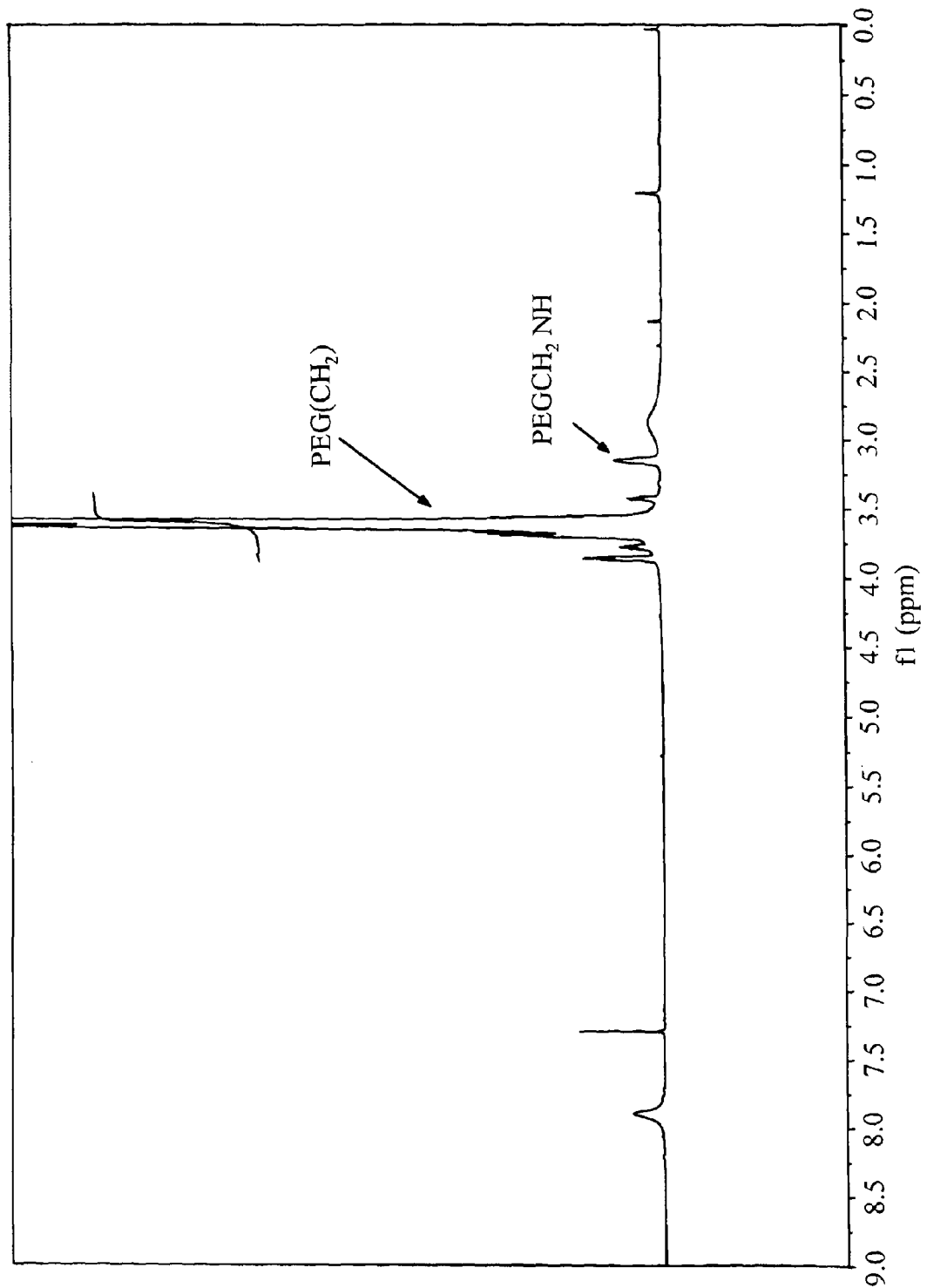
FIG. 7—shows the $^1$H-NMR spectrum of HO-PEG$_{44}$-NH$_2$ (Example 2): CDCl$_3$ (top), CDCl$_3$+5% v/v TFA anhydride (bottom)
Figure 7B:
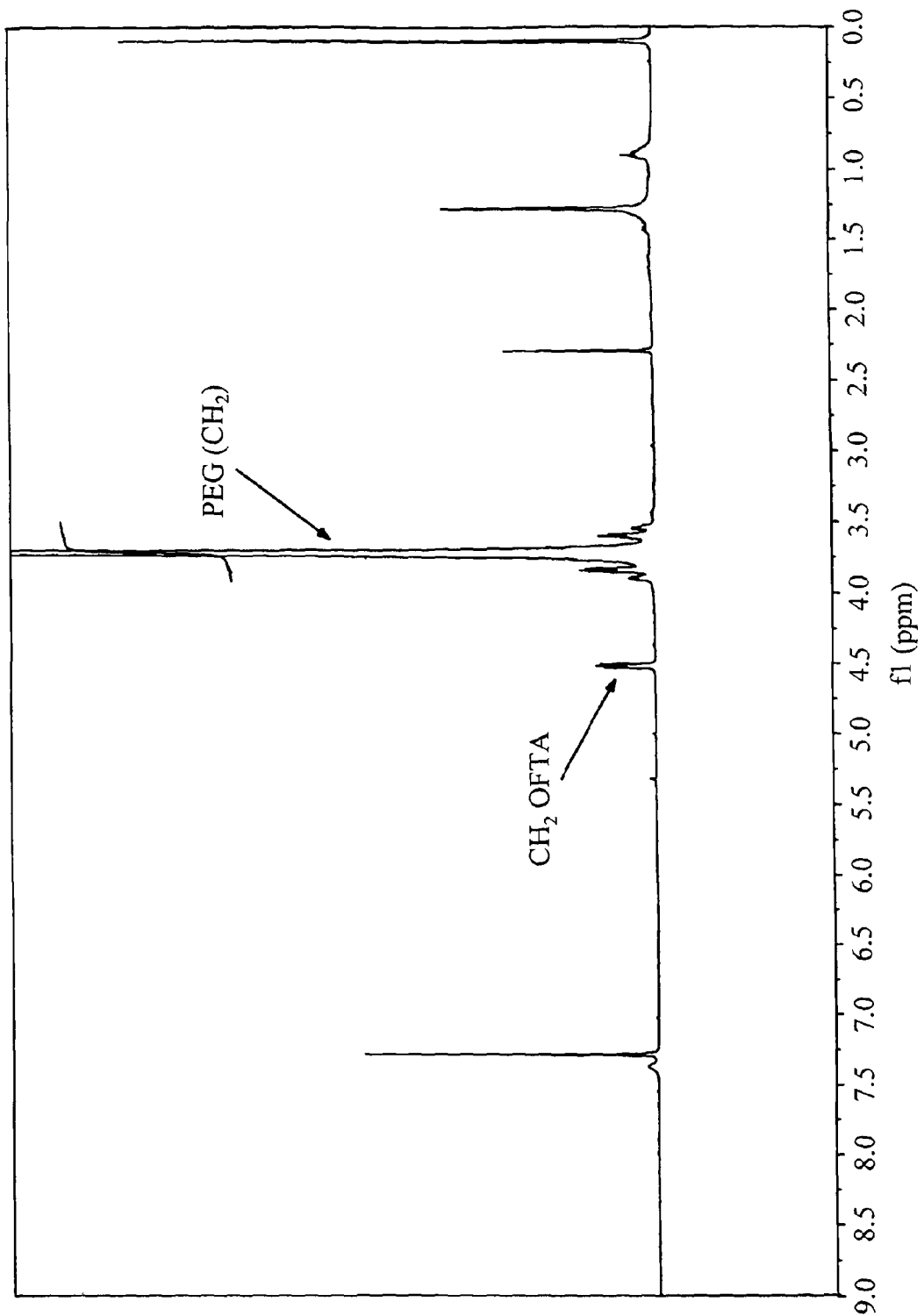

FIG. 7 shows $^1$H-NMR spectrum of HO-PEG$_{44}$-NH$_2$: $CDCl_3$ (top), $CDCl_3$+5% v/v TFA anhydride (bottom); purity may be assessed by the similar size of the ratio of the integral of the $CH_2NH_2$ peak to $OCH_2$ in the top spectrum, to the ratio of the integral of the $CH_2$OTFA peak to $OCH_2$ in the bottom spectrum.

Example 3

Synthesis of HO-PEG$_{44}$-N$_3$

Step 1 and Step 2

As in example 2, above.

Step 3—Synthesis of benzene-1,3,5-($CO_2$-PEG$_{44}$-N$_3$)$_3$

Benzene-1,3,5-($CO_2$-PEG$_{44}$-OMs)$_3$ (0.960 g, 0.15 mmol) was co-evaporated with dry MeCN (3×10 ml) and dissolved in DMF (3 ml). DI water (0.250 ml) and $NaHCO_3$ (24 mg) were added followed by NaN$_3$ (59 mg). The solution was stirred at 70° C. under nitrogen, and after 20 h the solution was allowed to cool. This was diluted with EtOAc (150 ml) and washed with half sat. $NaHCO_3$ (120 ml), DI water (3×120 ml), and brine (120 ml). The aqueous layer was then extracted with DCM (2×600 ml), the combined organic layers dried over $MgSO_4$, filtered and evaporated under vacuum to give benzene-1,3,5-($CO_2$-PEG$_{44}$-N$_3$)$_3$ (0.368 g, 39%). $\delta_H$ (400 MHz, $CDCl_3$); 3.41-3.43 (6H, t, J 3.4 $CH_2N_3$), 3.48-3.86 (534H, m, 267×$OCH_2$), 3.89 (6H, t, J 3.9, 3×$CO_2CH_2CH_2O$), 4.56 (6H, t, 14.6, 3×$CO_2CH_2$), 8.89 (3H, s, Ar) ppm.

Step 4—Synthesis of HO-PEG$_{44}$-N$_3$

Benzene-1,3,5-($CO_2$-PEG$_{44}$-N$_3$)$_3$ (0.100 g, 0.016 mmol) was dissolved in aq. NH$_3$ (2.5 ml, 35% v/v) and stirred overnight. The solution was evaporated under vacuum and co-evaporated with water until no odour of ammonia was detectable. The residue was dissolved in DCM (50 ml) and washed with DI water (50 ml). The aqueous layer was extracted with further DCM (2×50 ml). The combined organic fractions were dried over MgSO$_4$, filtered and evaporated under vacuum to yield HO-PEG$_{44}$-N$_3$ (0.086 g, 88%). $\delta_H$ (400 MHz, CDCl$_3$); 3.37 (2H, t, J 3.4 CH$_2$N$_3$), 3.43-3.81 (182H, m, 91×OCH$_2$) ppm.

Figure 8A:
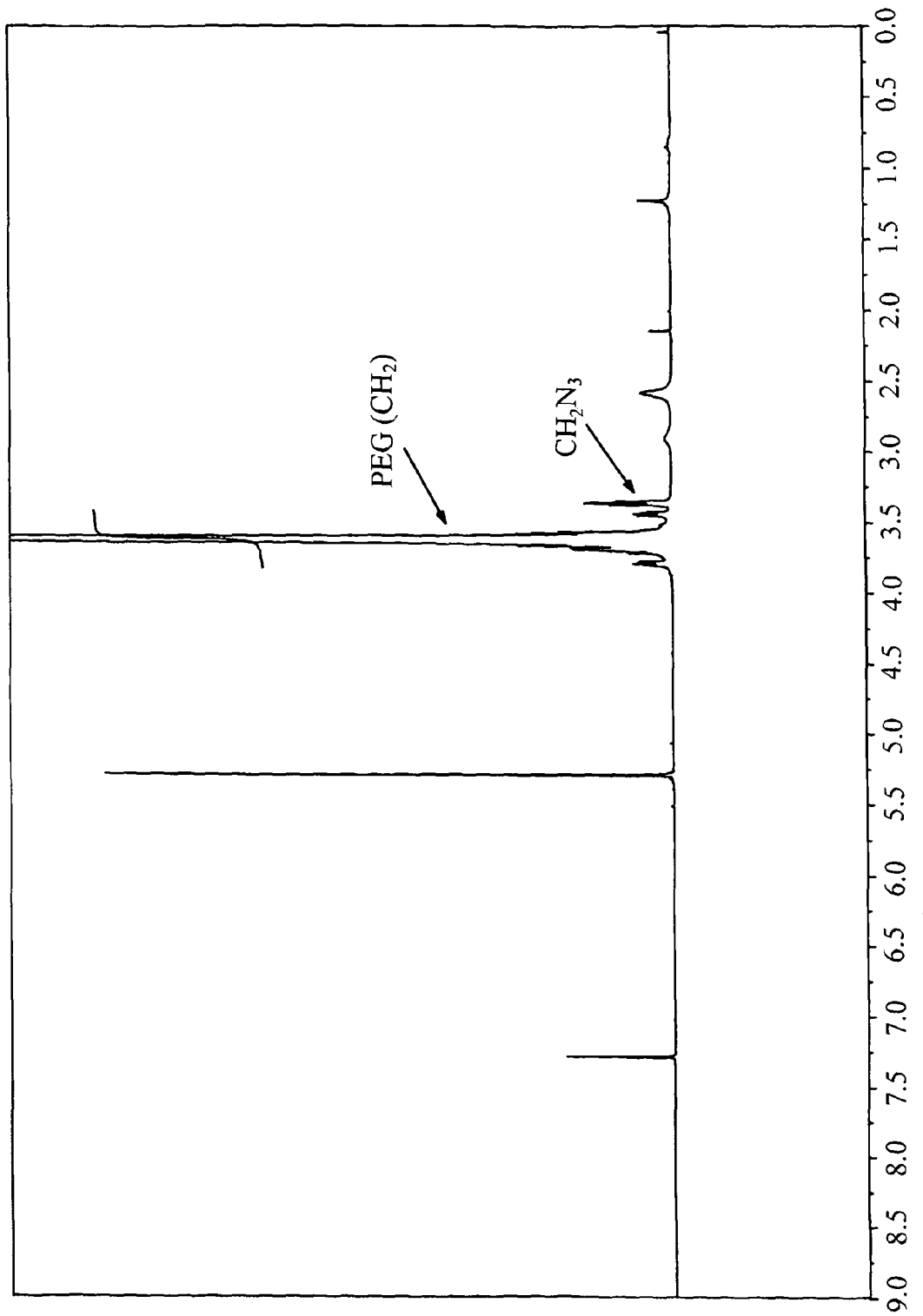
FIG. 8—shows the $^1$H-NMR spectrum of HO-PEG$_{44}$-N$_3$ (Example 3): CDCl$_3$ (top), CDCl$_3$+5% v/v TFA anhydride (bottom)
Figure 8B:
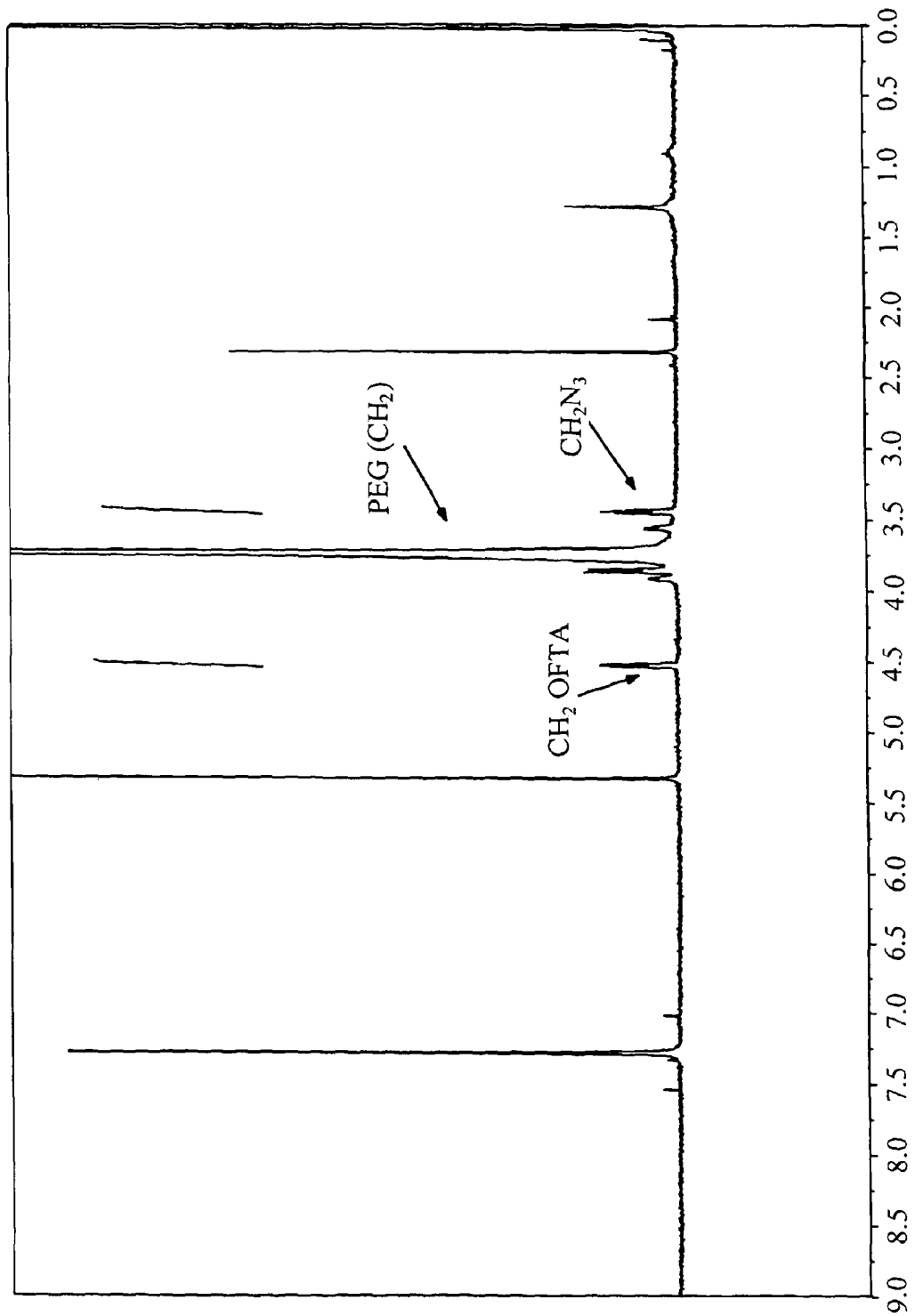
Figure 9:
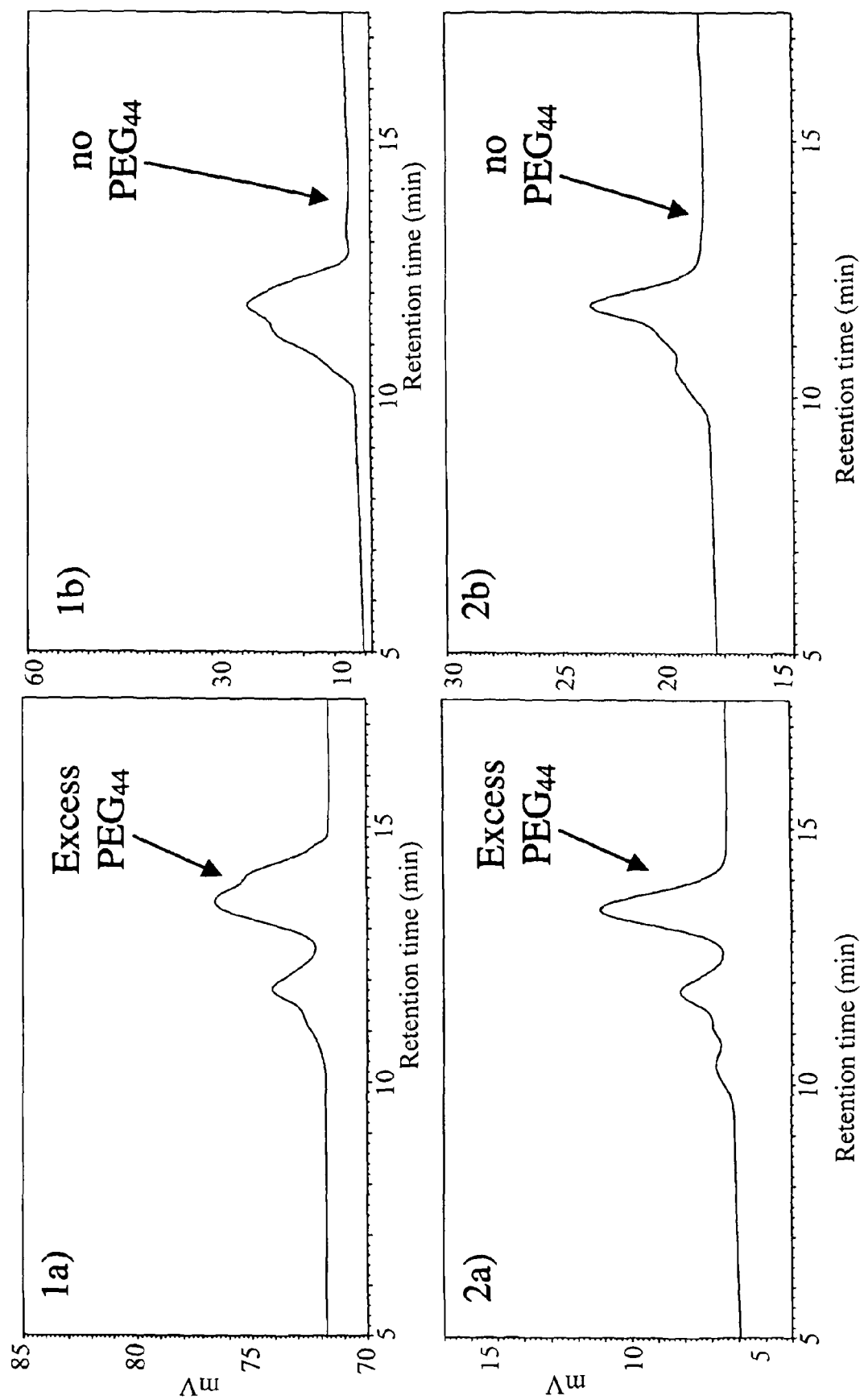
FIG. 9—presents the gel permeation chromatography (GPC) chromatograms of the OSN separations, showing the removal of excess PEG: 1, PhSi—(O-PEG$_{44}$-OH)$_3$, Example 1, Step 1, a) feed, b) pure; 2, Benzene-1,3,5-(CO$_2$-PEG$_{44}$-OH)$_3$, Examples 2 and 3, Step 1, a) feed, b) pure; Branched products (~6000 g mol$^{-1}$) eluted at t$_r$=~11.7 min, and excess PEG (~2000 g mol$^{-1}$) at t$_r$=~13 min). Conditions: solvent, NMP; T=100° C.; detection, RI.

FIG. 8 shows $^1$H-NMR spectrum of HO-PEG$_{44}$-N$_3$: CDCl$_3$ (top), CDCl$_3$+5% v/v TFA anhydride (bottom)

Example 4

Synthesis of C$_6$H$_3$-1,3,5-(CH$_2$OPeg$_{12}$OCH$_2$Nph)$_3$

Step 1—Synthesis of C$_6$H$_3$-1,3,5-(CH$_2$OPeg$_4$OH)$_3$

60% Dispersion of sodium hydride in mineral oil (205 mg, 5 mmol, 5 eq.) was washed with pet. ether (×3), suspended in DMF (7 mL) and cooled in an ice-water bath. Tetragol (HO-PEG$_{44}$-OH, 5.84 g, 30 mmol) was evaporated from MeCN (3×10 mL), taken up in DMF (2 mL) and added dropwise to the briskly stirred sodium hydride suspension, maintaining gentle effervescence and rinsing out the flask with further DMF (2×0.5 mL). The cooling bath was removed and the reaction stirred at RT for 90 min. After this, glacial acetic acid (1 mL) was added and the solvent stripped off (oil pump). The residue was taken up in CHCl$_3$, washed with 10% sat. NaHCO$_3$ (×2), and the combined aqueous layers extracted with further CHCl$_3$ (×2). The combined organic layers were washed with 10% brine, and the aqueous layer back-extracted with CHCl$_3$ (×2). The combined organic layers were dried over Na$_2$SO$_4$, and evaporated to dryness under reduced pressure. The residue was fractionated by silica gel chromatography, eluting with a gradient of MeOH—CHCl$_3$ (0:1 to 1:9), to give the cyclic byproduct 1-(HOPeg$_4$OCH$_2$)—C$_6$H$_3$-3,5-(CH$_2$OPeg$_4$OCH$_2$) (49 mg, elutes 4% MeOH, 8%), and the desired homostar C$_6$H$_3$-1,3,5-(CH$_2$OPeg$_4$OH)$_3$ (375 mg, elutes 6-10% EtOH, 52%). R$_f$ (MeOH—CHCl$_3$, 1:9 v/v) product 0.22, byproduct 0.38; NMR $\delta_H$ (CDCl$_3$, 400 MHz) 7.22 (3H, s), 4.53 (6H, s), 3.71-3.68 (48H, m), 3.00 (3H, br. s) ppm; HRMS (ESI+) m/z [M+Na]$^+$719.3824 (100%), C$_{33}$H$_{60}$NaO$_{15}$ requires 719.3825; peak at 675.3573 (3%) corresponds to [M+Na-(ethylene oxide)]$^+$, C$_{31}$H$_{56}$NaO$_{14}$ requires 675.3563, from trigol contamination of tetragol.

Step 2—Synthesis of TsOPeg$_4$OH

Tetragol (2.0 g, 10.3 mmol, 10 eq.) was co-evaporated from MeCN (3×5 mL), and dissolved in DCM (5 mL). To the stirred solution was added of p-toluenesulfonyl chloride (0.196 g, 1.03 mmol) then triethaylamine (0.21 mL, 1.5 mmol, 1.5 eq.). The next day the solution was diluted with DCM, washed with water (×2), then 20% sat. NaHCO$_3$. The combined aqueous layers were similarly back-extracted with further DCM. The combined organic layers were dried over Na$_2$SO$_4$, and evaporated under reduced pressure. The residue was fractionated through a pad of silica, eluting with a gradient of EtOAc-DCM (0:1-9:1), to give the product as a colourless oil (286 mg, 80%). R$_f$(EtOAc-DCM, 2:3 v/v) 0.34; NMR $\delta_H$ (CDCl$_3$, 400 MHz) 7.82 (2H, d, J 7), 7.37 (2H, d J 7), 4.19 (2H, t, J 4), 3.74-3.60 (14H, m), 2.47 (3H, s), 2.42 (1H, br. s) ppm; HRMS (ESI+) m/z [M+Na]$^+$371.1140 (100%), C$_{15}$H$_{24}$NaO$_7$S requires 371.1135.

Step 3—Synthesis of DmtrOPeg$_4$OTs

TsOPeg$_4$OH (0.336 g, 1.05 mmol) and 4,4'-dimethoxytriphenyl methanol (DmtrOH, 0.332 g, 1.0 mmol) were dissolved in DCM (30 mL) to which was added 3 Å molecular sieves (12.7 g). To the mixture was added p-toluenesulfonic acid monohydrate (15 mg); initially, the strong orange colour of the Dmtr cation was observed, but this largely dissipated after 30 min. After 2 hr, Et$_3$N (0.5 mL) was added and the solution was decanted from the molecular sieves, washing with further DCM. The solution was partitioned with sat. NaHCO$_3$, dried over Na$_2$SO$_4$, and evaporated under reduced pressure. The residue was fractionated through a pad of silica (100 mL), loading with DCM-pet. ether and eluting with a gradient of EtOAc-pet. ether (0:1-1:1), ensuring that all solvents contained 0.5% Et$_3$N, to give the product as a faintly yellow oil (454 mg, 70%). R$_f$(EtOAc-pet. ether, 3:2 v/v+trace Et$_3$N) 0.42; NMR $\delta_H$(d$_6$-DMSO, 400 MHz) 7.76 (2H, d, J 7), 7.45 (2H, d, J 7), 7.40 (2H, d, J 7), 7.32-7.19 (7H, m), 6.88 (4H, d, J 7), 4.08 (2H, t, J 4), 3.73 (6H, s), 3.57-3.43 (12H, m), 3.04 (2H, t, J 4), 2.40 (3H, s) ppm; HRMS (ESI+) m/z [M+Na]$^+$ 673.2416 (100%), C$_{36}$H$_{42}$NaO$_9$S requires 673.2442.

Step 4—Synthesis of C$_6$H$_3$-1,3,5-(CH$_2$OPeg$_8$ODmtr)$_3$

60% Sodium hydride in mineral oil (17 mg, 0.42 mmol, 6 eq.) was washed with pet. ether (×3), suspended in DMF (0.2 mL), and cooled in an ice-water bath. C$_6$H$_3$-1,3,5-(CH$_2$OPeg$_4$OH)$_3$ (46 mg, 0.066 mmol) and DmtrOPeg$_4$OTs (444 mg, 0.68 mmol, 10 eq.) were co-evaporated from MeCN (3×5 mL), then dissolved in DMF (1.0 mL), and added dropwise to the sodium hydride, rinsing the flask with further DMF (2×0.25 mL). The following day sat. NH$_4$Cl (0.5 ml) was added, and the solvent stripped off in vacuo (oil pump). The residue was taken up in DCM and washed with 10% sat. NaHCO$_3$, back-extracting the aqueous layer with further DCM. The combined organic layers were washed with 10% brine, and the aqueous layer back-extracted with further DCM. The combined organic layers were dried over Na$_2$SO$_4$, and evaporated to dryness under reduced pressure. The residue (410 mg) was fractionated through a pad of silica (100 mL), loading with DCM-pet. ether and first eluting with a gradient of EtOAc-pet. ether (0:1-1:0), ensuring that all solvents contained 0.5% Et$_3$N; the excess DmtrOPeg$_4$OTs (268 mg, eluting up to 50% EtOAc, 85% of predicted unreacted material) was recovered, plus a small amount of DmtrOPeg$_8$ODmtr (34 mg) from reaction with residual water. The silica pad was then washed with EtOH-DCM (1:19, containing 0.5% Et$_3$N) to give the product (127 mg, 90%) as a pale yellow oil. R$_f$(MeOH—CHCl$_3$, 1:9 v/v+trace Et$_3$N) 0.38; NMR $\delta_H$ (CDCl$_3$+0.1% Et$_3$N, 400 MHz) 7.47 (6H, d, J 7), 7.34 (12H, d, J 7), 7.28 (6H, t, J 7), 7.22 (3H, s), 7.20 (3H, t, J 7), 6.82 (12H, d, J 7), 4.56 (6H, s), 3.80 (18H, s), 3.71-3.61 (90H, m), 3.23 (6H, t, J 4) ppm; MS (ESI+) m/z [M+Na]$^+$2155 (9%), C$_{120}$H$_{162}$NaO$_{33}$ requires 2155.5, [M-Dmtr+H+NH$_4$]$^+$1848 (17%), [M-2Dmtr+2H+NH$_4$]$^+$ 1546 (6%), [M-Dmtr+Na$^+$ NH$_4$]$^{2+}$1087 (77%), [Dmtr]$^+$303 (100%).

Step 5—Synthesis of C$_6$H$_3$-1,3,5-(CH$_2$OPeg$_8$OH)$_3$

C$_6$H$_3$-1,3,5-(CH$_2$OPeg$_8$ODmtr)$_3$ (120 mg, 0.056 mmol) was dissolved in DCM (2 mL). To the stirred solution was added dichloroacetic acid (0.019 mL, 4 eq.) when the solution turned the intense orange of Dmtr cation. This was followed by pyrrole (0.072 mL, 20 eq.); over 5 min the colour completely discharged. After 11 min triethylamine (0.5 mL) was added and the solvent stripped off in vacuo (oil pump). The residue was taken up in DCM and washed with 30% sat. brine, back-extracting the aqueous layer with further DCM (×3). The combined organic layers were dried over $Na_2SO_4$, and evaporated to dryness. The residue was fractionated through a pad of silica, eluting with a gradient of EtOH—$CHCl_3$ (0:1-1:4), to give the product as a colourless oil (51 mg, 74%). $R_f$ (MeOH—$CHCl_3$, 1:9 v/v) 0.29; NMR $\delta_H$ ($CDCl_3$, 400 MHz) 7.21 (3H, s), 4.53 (6H, s), 3.72-3.57 (96H, m), 2.97 (3H, br. s) ppm; MS (ESI+) m/z $[M+Na]^+$1247.8 (11%), $C_{57}H_{108}NaO_{27}$ requires 1247.7, $[M+2Na]^{2+}$635.4 (100%); peak at 1198.8 (ca. 0.5%) corresponds to $[M+NH_4$-(ethylene oxide)$]^+$, $C_{55}H_{108}NO_{26}$ requires 1198.7, indicates no significant basic depolymerisation during chain extension.

Step 6—Synthesis of $NphCH_2OPeg_4OH$

60% Sodium hydride (120 mg, 3 mmol, 1.5 eq.) was washed with pet. ether (×3), suspended in DMF (1 mL) and cooled in an ice-water bath. Tetragol (3.88 g, 20 mmol, 10 eq.) was co-evaporated from MeCN (3×10 mL), taken up in DMF (4 mL), and added dropwise to the briskly stirred sodium hydride, maintaining gentle effervescence. Solid 2-bromomethylnaphthylene (442 mg, 2 mmol) was then added, the cooling bath was removed, and stiffing continued for 1 hr. After this, sat. $NH_4Cl$ (0.5 mL) was added, and the solvent stripped off in vacuo (oil pump). The residue was taken up is $CHCl_3$, washed with water (×2) and the aqueous layer back-extracted with further $CHCl_3$. The combined organic fractions were dried over $Na_2SO_4$, and evaporated under reduced pressure. The crude product (740 mg) was used without further purification. $R_f$(MeOH-DCM, 1:19 v/v) 0.50; NMR $\delta_H$ ($CDCl_3$, 400 MHz) 7.88-7.79 (4H, m), 7.51-7.44 (3H, m), 4.75 (2H, s), 3.75-3.66 (14H, m), 3.61 (2H, t, J 3), 2.76 (1H, br. s) ppm; HRMS (ESI+) m/z $[M+Na]^+$357.1669 (100%), $C_{19}H_{26}NaO_5$ requires 357.1673.

Step 7—Synthesis of $NphCH_2OPeg_4OTs$

Crude $Nph-Peg_4$-OH (0.702 g, 2.1 mmol) was co-evaporated from MeCN (3×5 mL), and dissolved in DCM (5 mL). To this solution were added p-toluenesulfonyl chloride (0.60 g, 3.2 mmol, 2 eq.), then triethaylamine (0.88 mL, 6.3 mmol, 3 eq.), and the reaction was stirred for 4 hr. After this, sat. $NaHCO_3$ (5 mL) was added and vigorous stirring continued for 20 min. The reaction was diluted with DCM, washed with water (×2), and then with 20% sat. $NaHCO_3$. The combined aqueous layers were back-extracted with DCM and washed similarly. The combined organic fractions were dried over $Na_2SO_4$, and evaporated under reduced pressure. The residue was fractionated through a pad of silica, eluting with a gradient of EtOAc-pet. ether (0:1-3:2). $R_f$ (EtOAc-DCM, 2:3 v/v) 0.62; NMR $\delta_H$ ($CDCl_3$, 400 MHz) 7.88-7.79 (6H, m), 7.52-7.47 (3H, m), 7.33 (2H, d, J 7), 4.76 (2H, s), 4.17 (2H, t, J 4), 3.72-3.58 (14H, m), 3.45 (3H, s) ppm; HRMS (ESI+) m/z $[M+Na]^+$511.1768 (100%), $C_{26}H_{32}NaO_7S$ requires 511.1761.

Step 8—Synthesis of $C_6H_3$-1,3,5-$(CH_2OPeg_{12}OCH_2Nph)_3$

60% Sodium hydride in mineral oil (11.6 mg, 0.29 mmol, 6 eq.) was washed with pet. ether (×2), suspended in DMF (0.1 mL), and cooled in a water bath. $C_6H_3$-1,3,5-$(CH_2OPeg_8OH)_3$ (51 mg, 0.042 mmol) and $NphCH_2OPeg_4OTs$ (206 mg, 0.42 mmol, 10 eq.) were co-evaporated from MeCN (4×3 mL), then dissolved in DMF (0.5 mL) and added dropwise to the briskly stirred sodium hydride, rinsing the flask with further DMF (2×0.2 mL). The following day sat. $NH_4Cl$ (0.2 ml) was added, and the solvent stripped off in vacuo (oil pump). The residue was taken up in $CHCl_3$ and washed with 10% sat. $NaHCO_3$, back-extracting the aqueous layer with further $CHCl_3$. The combined organic layers were washed with 20% brine, and the aqueous layer back-extracted with further $CHCl_3$. The combined organic layers were dried over $Na_2SO_4$, and evaporated to dryness under reduced pressure. The residue (219 mg) was fractionated by diafiltration using a crosslinked polyimide membrane prepared as described in PCT/GB2007/050218 to give the product as a pale yellow oil. NMR $\delta_H$ ($CDCl_3$, 400 MHz) 7.87-7.79 (12H, m), 7.52-7.47 (9H, m), 7.23 (3H, s), 4.74 (6H, s), 4.55 (6H, s), 3.73-3.58 (144H, m) ppm; MS (ESI+) m/z $[M+Na^+ \; NH_4]^{2+}$1107.7 (8%), $C_{114}H_{184}NNaO_{39}$/2 requires 1107.6, $[M+Na+2NH_4]^{3+}$744.1 (23%).

It is clear to one skilled in the art that the PEG chains can be further extended to the desired mono-disperse molecular weight, and subsequently cleaved from the branch point molecule (trimethyl benzyl moiety) to provide the mono-disperse polymer product.

TABLE 1

Characterisation of the heterobifunctional polymers produced in Examples 1-3.

| Example | Purity (%) |
|---|---|
| 1, HO-$PEG_{44}$-Phth | 98 |
| 2, HO-$PEG_{44}$-$NH_2$ | 100 |
| 3, HO-$PEG_{44}$-$N_3$ | 99 |

The invention claimed is:

1. A process for the preparation of heterobifunctional or mono-disperse polymers comprising the following steps:
   (a) reacting an excess of an initial polymer dissolved in a solvent with a branch point molecule to form a polymer mixture containing at least the initial polymer and a conjugate comprising at least two polymer molecules covalently bound to the branch point molecule such that each polymer molecule has a terminal which is bound to the branch point molecule and at least one unbound terminal;
   (b) contacting the polymer mixture with a semi-permeable membrane which has a rejection for the conjugate which is greater than the rejection for the initial polymer, so that the ratio between the concentrations of the conjugate and the initial polymer in the retentate is increased; and
   (c) cleaving the polymer from the branch point molecule of the conjugate;
   wherein the at least one unbound terminal of the polymer molecule of the conjugate is chemically modified to either modify the functionality of the unbound terminal of the polymer or add additional monomer or polymer units to the polymer and said modification occurs either prior to or subsequent to step (b) such that the polymer cleaved from branch point molecule comprises the initial polymer comprising at least one chemically modified terminal.

2. The process as in claim 1, wherein the process is a process for the preparation of heterobifunctional polymers and said chemical modification involves the removal of any protecting groups that may be present at the unbound terminal of the polymer followed by the functionalisation of the unbound terminal.

3. The process according to claim 1, wherein the process is a process for the preparation of monodisperse polymer and said chemical modification involves the removal of any protecting groups that may be present at the unbound terminal followed by reaction of the unbound terminal of the polymer present in the conjugate with another polymer or monomer unit.

4. The process according to claim 1, wherein the chemical modification of the polymer occurs prior to step (b).

5. The process according to claim 1, wherein the chemical modification occurs subsequent to step (b).

6. The process according to claim 1 in which more than one membrane filtration step is used to purify the conjugate or its derivatives from the initial polymer, reagents and by-products, by contacting mixtures containing the conjugate or its derivatives and the initial polymer, reagents and by-products with the semi-permeable membrane which has a rejection for the conjugate or its derivatives which is greater than the rejection for at least one of the initial polymer, reagents and by-products present, so that the ratio between the concentrations in the retentate of the conjugate or one of its derivatives and at least one of the initial polymer, reagents and by-products, is increased.

7. The process according to claim 1, in which additional solvent is added to the retentate and permeated through the membrane to remove further initial polymer, by-products or excess reagents by diafiltration.

8. The process according to claim 7 in which the additional solvent is the same as the reaction solvent.

9. The process according to claim 1 in which the additional solvent is not the same as the reaction solvent, and in which the polymer product is maintained dissolved in the solvents throughout the diafiltration.

10. The process according to claim 1 in which the initial polymer is selected from the group consisting of: polyethylene glycol, polypropylene glycol, polybutylene oxide and block copolymers of any of these, polypropylene oxide block copolymers of polypropylene oxide and polyethylene glycol, polydimethylsiloxane (PMDS), polybutadiene and polyisoprene, nylons and polyesters formed with either the di-acid in excess to generate polymers terminating in carboxylic acids, or the di-amine/diol in excess to generate polymers terminating with amino/hydroxyl groups, and polyethylene sulphide.

11. The process as claimed in claim 1 in which the linkage between the initial polymer and the branch point molecule is selected from the group consisting of: ether, ester, and amide, linkages, including phosphate esters, silyl ethers, acetals, orthoesters, thio-ethers, and olefin bonds.

12. The process according to claim 1 in which the membrane is a polymeric membrane.

13. The process according to claim 1 in which the membrane is a ceramic membrane.

14. The process according to claim 2, wherein the chemical modification of the polymer occurs prior to step (b).

15. The process according to claim 3, wherein the chemical modification of the polymer occurs prior to step (b).

16. The process according to claim 2, wherein the chemical modification occurs subsequent to step (b).

17. The process according to claim 3, wherein the chemical modification occurs subsequent to step (b).

18. The process according to claim 2 in which more than one membrane filtration step is used to purify the conjugate or its derivatives from the initial polymer, reagents and by-products, by contacting mixtures containing the conjugate or its derivatives and the initial polymer, reagents and by-products with the semi-permeable membrane which has a rejection for the conjugate or its derivatives which is greater than the rejection for at least one of the initial polymer, reagents and by-products present, so that the ratio between the concentrations in the retentate of the conjugate or one of its derivatives and at least one of the initial polymer, reagents and by-products, is increased.

19. The process according to claim 3 in which more than one membrane filtration step is used to purify the conjugate or its derivatives from the initial polymer, reagents and by-products, by contacting mixtures containing the conjugate or its derivatives and the initial polymer, reagents and by-products with the semi-permeable membrane which has a rejection for the conjugate or its derivatives which is greater than the rejection for at least one of the initial polymer, reagents and by-products present, so that the ratio between the concentrations in the retentate of the conjugate or one of its derivatives and at least one of the initial polymer, reagents and by-products, is increased.

* * * * *